United States Patent
Halliday et al.

(10) Patent No.: US 8,737,165 B2
(45) Date of Patent: **\*May 27, 2014**

(54) INTERFEROMETRIC SEISMIC DATA PROCESSING FOR A TOWED MARINE SURVEY

(75) Inventors: David Fraser Halliday, Fife (GB); Julian Edward Kragh, Finchingfield (GB)

(73) Assignee: WesternGeco L.L.C., Houston, TX (US)

( \* ) Notice: Subject to any disclaimer, the term of this patent is extended or adjusted under 35 U.S.C. 154(b) by 517 days.

This patent is subject to a terminal disclaimer.

(21) Appl. No.: 12/896,643

(22) Filed: Oct. 1, 2010

(65) Prior Publication Data

US 2012/0081999 A1   Apr. 5, 2012

(51) Int. Cl.
 *G01V 1/28* (2006.01)
 *G01V 1/38* (2006.01)
(52) U.S. Cl.
 CPC ... *G01V 1/28* (2013.01); *G01V 1/38* (2013.01)
 USPC ................................................. 367/21; 367/38
(58) Field of Classification Search
 USPC ....................................................... 367/21, 38
 See application file for complete search history.

(56) References Cited

U.S. PATENT DOCUMENTS

| | | | |
|---|---|---|---|
| 6,094,620 A * | 7/2000 | Gasparotto et al. | 702/14 |
| 7,969,818 B2 * | 6/2011 | Burren | 367/21 |
| 2005/0190649 A1 | 9/2005 | Eisner et al. | |
| 2006/0253759 A1 | 11/2006 | Wei | |
| 2008/0130411 A1 | 6/2008 | Brandsberg-Dahl et al. | |
| 2010/0067328 A1 | 3/2010 | Curtis | |
| 2010/0265797 A1 * | 10/2010 | Robertsson et al. | 367/43 |
| 2010/0329077 A1 * | 12/2010 | Ozbek et al. | 367/38 |

OTHER PUBLICATIONS

International Search Report and Written Opinion issued in PCT/US2011/052094 on May 1, 2012, 9 pages.
Draganov et al., "Reflection Images From Ambient Seismic Noise", Geophysics, vol. 74, No. 5 (2009), pp. A63-A67.
Hampson et al., "The Effects of Source and Receiver Motion on Seismic Data", Geophysical Prospecting (1995) vol. 43, pp. 221-244.
Wapenaar, "Retrieving the Elastodynamic Green's Function of an Arbitrary Inhomogeneous Medium by Cross Correlation," Physical Review Letters, Dec. 2004, vol. 93: pp. 254301-1-254301-4.

\* cited by examiner

*Primary Examiner* — Ian J Lobo

(57) ABSTRACT

A method for processing seismic data. The method includes receiving the seismic data acquired at two or more sensors on a towed marine survey and regularizing the received seismic data into a spatial domain. After regularizing the seismic data, the method includes classifying the regularized seismic data below and equal to a predetermined frequency as low-frequency seismic data. The method then calculates a set of low-frequency Green's functions using interferometry on the low-frequency seismic data described above. The method then processes high-frequency seismic data of the seismic data to create a set of high-frequency Green's functions at one or more source locations of the towed marine survey. After creating the set of high-frequency Green's functions, the method merges the set of low-frequency Green's functions and the set of high-frequency Green's functions to create a set of broad-band Green's functions at the source locations.

20 Claims, 4 Drawing Sheets

INTERFEROMETRIC SEISMIC DATA PROCESSING FOR A TOWED MARINE SURVEY

BACKGROUND

1. Field of the Invention

Implementations of various technologies described herein generally relate to methods and systems for processing seismic data for a towed marine survey.

2. Description of the Related Art

The following descriptions and examples are not admitted to be prior art by virtue of their inclusion within this section.

Seismic data signals are typically acquired by measuring and recording data during a land or marine seismic survey. A land seismic survey may be performed by repeatedly firing an impulsive seismic energy source at the surface of the earth and recording the received signals at a set of sensors. Similarly, a marine seismic survey may be performed by repeatedly firing an impulsive seismic energy source (e.g., air-guns, dynamite, marine vibrators or the like) into the sea or at the seafloor and recording the received signals at a set of sensors. In a towed marine seismic survey, the sensors are typically disposed on seismic streamers and the source is disposed on a seismic source array. Both, the seismic streamers and the seismic source array, may be towed across the sea by a vessel. The sensors may typically be laterally displaced at regular intervals along the seismic streamers. However, there may be situations where a non-regular distribution of the sensors may be preferred or where the source array and the streamers may be positioned at different depth levels. In a typical marine seismic survey, the source and the sensors may be displaced at fixed intervals (e.g., 25 meters) and in a certain direction (e.g., the "inline" direction).

During the marine seismic survey, the cycle of firing the source and recording the received signals may be repeated a plurality of times. When firing the seismic source, a pressure wave may be excited and propagated into the subsurface of the seafloor. The pressure wave reflects off interfaces between various earth layers (such as rock, sand, shale, and chalk layers) and propagates upwardly to the set of sensors, where the particle velocity of the wave vibrations or the pressure oscillations of the wave may be measured and recorded. The measured particle velocity of the wave vibrations or the pressure oscillations of the wave may then be used to generate a seismic image of the subterranean surface of the seafloor.

SUMMARY

Described herein are implementations of various techniques and technologies for processing seismic data acquired from a marine seismic survey. In one implementation, a method for processing seismic data acquired from a marine seismic survey may include receiving the seismic data acquired at two or more sensors on a towed marine survey and regularizing the received seismic data into a spatial domain. After regularizing the seismic data, the method may classify the regularized seismic data below and equal to a predetermined frequency as low-frequency seismic data. The method may then calculate a set of low-frequency Green's functions using interferometry on the low-frequency seismic data described above. The method may then process high-frequency seismic data of the seismic data to create a set of high-frequency Green's functions at one or more source locations of the towed marine survey. After creating the set of high-frequency Green's functions, the method may merge the set of low-frequency Green's functions and the set of high-frequency Green's functions to create a set of broad-band Green's functions at the source locations.

In another implementation, the method for processing seismic data acquired from a marine seismic survey may include receiving the seismic data acquired at two or more sensors on a towed marine survey, regularizing the seismic data in space and classifying the regularized seismic data above and equal to a predetermined frequency as high-frequency seismic data and below and equal to the predetermined frequency as low-frequency seismic data. After classifying the regularized seismic data, the method may re-sample the low-frequency seismic data based on the predetermined frequency as described above. The method may then attenuate one or more noise modes in the re-sampled seismic data and calculate a set of low-frequency Green's functions using interferometry on the attenuated seismic data. After calculating the set of low-frequency Green's functions, the method may process the high-frequency seismic data of the seismic data to create a set of high-frequency Green's functions at one or more source locations of the towed marine survey. The method may then merge the set of low-frequency Green's functions and the set of high-frequency Green's functions to create a set of broad-band Green's functions at the source locations.

In yet another implementation, the method for processing seismic data acquired from a marine seismic survey may include receiving seismic data acquired by one or more seismic sensors on a towed marine survey, regularizing the seismic data in space and classifying the regularized seismic data below and equal to a predetermined frequency as low-frequency seismic data. The method may then calculate a set of low-frequency Green's functions using interferometry on the low-frequency seismic data. After calculated the set of low-frequency Green's functions, the method may then process high-frequency seismic data of the seismic data to create a set of high-frequency Green's functions at one or more source locations of the towed marine survey. The method may then merge the set of low-frequency Green's functions and the set of high-frequency Green's functions to create a set of broad-band Green's functions at the source locations. Using the set of broadband Green's functions, the method may then generate a seismic image.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief summary of various techniques described herein. In general, various techniques described herein are directed to a system for processing seismic data acquired from a towed marine survey. Seismic data may be collected using active and passive surveying of a subsurface region in a marine seismic survey. The seismic data may be collected using sensors disposed on seismic streamers that may be towed across the ocean by a vessel. The passive surveying may continuously record seismic activity including times between source firings in the active survey. Like the seismic streamers, a source array may be towed across the ocean by a vessel. The source firings of the marine seismic survey may originate at the source array. Generally, the passive surveying may enable recording of low-frequency seismic response, while the active surveying may record high-frequency seismic data. However, there may be some overlap in the frequencies.

After receiving the seismic data from the sensors, the seismic data may be regularized with respect to space. The regularization of the seismic data includes organizing the seismic data received at each sensor in the marine seismic survey according to the position at which the seismic data was acquired in the ocean. After organizing the seismic data, the seismic data acquired at the same position may be concatenated to generate regularized seismic data.

The regularized seismic data may then be split between the high and low-frequencies, typically using a 2-5 Hz threshold to distinguish the frequencies. Unwanted noise modes such as ambient noise of the ocean may then be attenuated in the low-frequency seismic data using various seismic processing techniques. A set of low-frequency Green's functions may then be calculated by applying cross-correlations on the attenuated data acquired at different sensors.

A set of high-frequency Green's functions may then be generated for the high-frequency seismic data. The sets of low-frequency and high-frequency Green's functions may be merged to generate a broad-band set of Green's functions. The broad-band set of Green's functions may then be input to a full waveform inversion procedure to generate a seismic image of the subsurface region.

One or more implementations of various techniques for processing seismic data acquired from a marine seismic survey will now be described in more detail with reference to FIGS. 1-4 in the following paragraphs.

Figure 1:
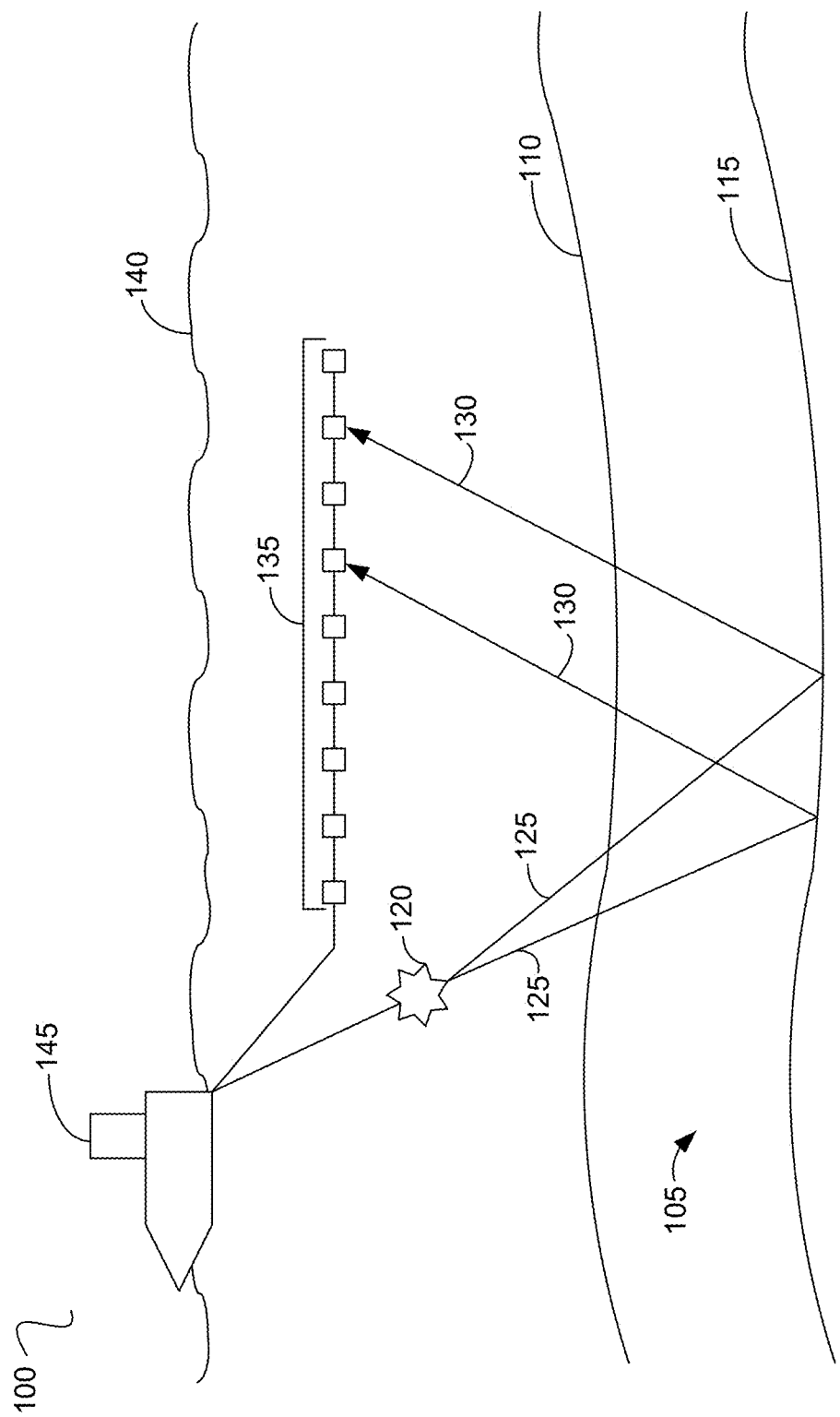
FIG. 1 illustrates a marine-based survey of a subterranean subsurface in accordance with one or more implementations of various techniques described herein.

FIG. 1 illustrates a marine-based survey 100 of a subterranean subsurface 105 in accordance with one or more implementations of various techniques described herein. The subsurface 105 includes the seafloor surface 110 and a reflector 115. The geological survey 100 may include active and passive surveying.

During active surveying, a seismic source 120 may fire elastic waves 125 (only two are indicated) into the subsurface 105. The elastic waves 125 may include a compressional wave ("P-wave") and a shear wave ("S-wave"), neither of which are shown. The component(s) of the elastic waves 125 may be reflected and converted by reflector 115, and reflections 130 may be received by a plurality of seismic sensors 135.

The reflections 130 may be low-frequency waves. In seismic surveying, frequencies at or below 2-5 Hz are typically considered low-frequency. The particular frequency value to define the low-frequency waves may be based on the sources and sensors used in the seismic survey.

The seismic sensors 135 may generate electrical signals representative of the received reflections 130. The electrical signals may be embedded with information regarding the subsurface 105 and captured as a record of seismic data. The electrical signals may be transmitted to a vessel 145 via transmission cables, wireless communication or the like. The vessel 145 may then transmit the electrical signals to a data processing center or may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by each of the seismic sensors.

Further, not all of the elastic waves propagate downward into the geological formation. Some of the elastic waves are interface waves that propagate along an interface between two media instead of through a medium. An interface wave can travel at the interface between the earth and air—e.g., surface waves—or the earth and a body of water—e.g., Scholte waves—for instance. Scholte waves may be associated with the interface between the ocean water and the earth (i.e., seafloor surface 110). Scholte waves may be of maximum intensity at the seafloor surface 110 and may decrease exponentially away from the seafloor surface 110 into both the ocean water and the subsurface. Scholte waves are a type of coherent noise generated by a surface wave that can obscure signals reflected from the reflector 115 and degrade the overall quality of the seismic data resulting from the survey.

Scholte waves may be high-frequency waves, generated by the source 120. Scholte waves may also be generated by noise from the surrounding environment. For example, noise from the surrounding environment may come from natural phenomena, such as earthquakes and the ocean. Surrounding noise may also come from self noise within the streamers and human activity, such as drilling and the like.

Passive surveying may be configured to record seismic data continuously while active surveying is taking place. Active surveying typically takes place over a number of days. However, even when source 120 is not firing, sensors 135 may still record seismic data generated by the surrounding noise. In this manner, the passive surveying may record seismic data resulting from the surrounding noise. The surrounding noise may include body waves, reflections 130 from structures within the subsurface 105 and the like.

Reflections 130 may also represent noise due to earthquakes, the oceans, environmental noise, and the like. While these reflections may provide relevant seismic information about the subsurface 105, they may also represent undesirable noise in the seismic data.

Figure 3:
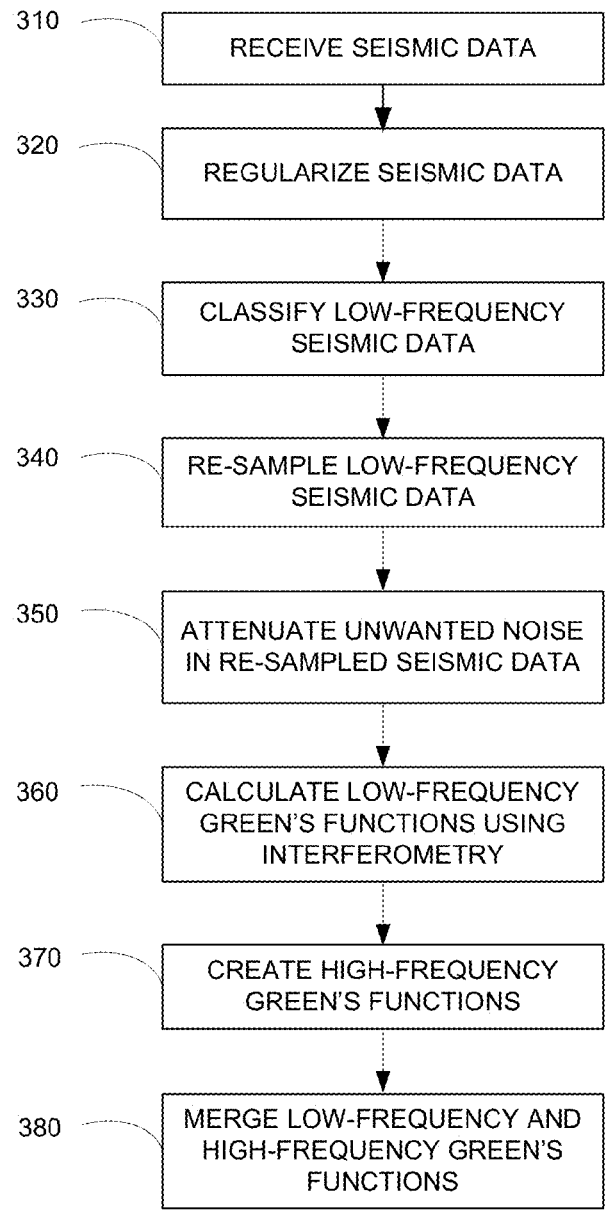
FIG. 3 illustrates a flow chart of a method for generating a seismic image of the subsurface in accordance with implementations described herein.

In one implementation, the seismic data may be processed to generate a seismic image of the subsurface 105. In another implementation, the seismic data may be processed to generate a velocity model of the subsurface 105. FIG. 3, below, describes a method for generating a seismic image of the subsurface 105.

Figure 2:
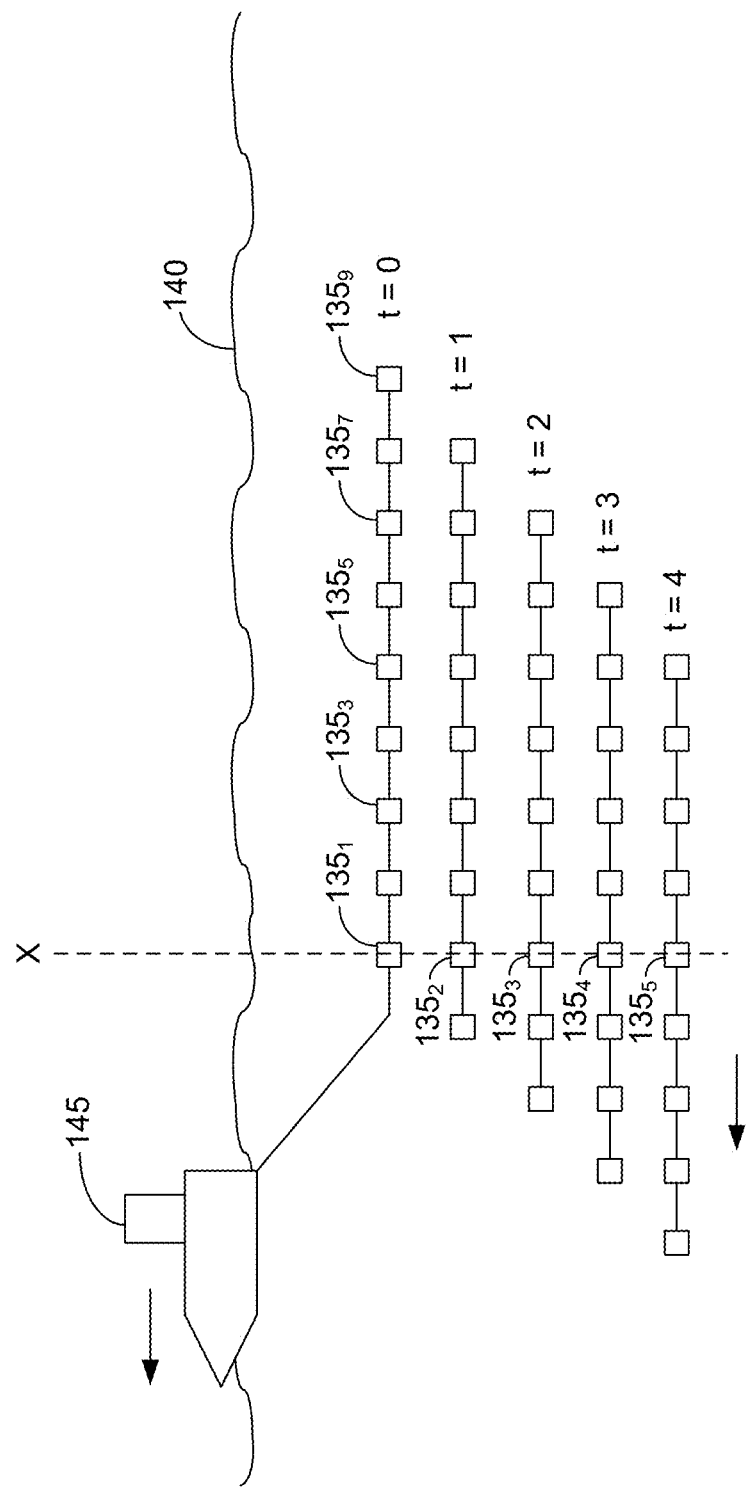
FIG. 2 illustrates a marine-based survey of a subterranean surface having sensors being towed by a vessel with respect to time in accordance with one or more implementations of various techniques described herein.

FIG. 2 illustrates a marine-based survey of a subterranean surface having sensors being towed by a vessel with respect to time in accordance with one or more implementations of various techniques described herein. The following description of the sensors being towed by a vessel with respect to time is made with reference to the marine-based survey of FIG. 1.

As shown in FIG. 2, vessel 145 tows a streamer that has sensors 135. At t=0, vessel 145 and sensors 135 are located at a particular location on the earth. For instance, at t=0, sensor $135_1$ may be located at position X. Position X denotes a particular location on the earth such as Global Positioning Coordinates (GPS) or the like. As time passes and vessel 145 tows sensors 135, each sensor 135 may pass position X if vessel 145 travels in a linear direction. As such, at t=1, sensor $135_2$ may be located at position X and at t=2, sensor $135_3$ may be located at position X, etc. During a seismic survey, sensors 135 may continuously record seismic data while each sensor 135 is towed through the sea. This seismic data may be used to generate a seismic image of the subsurface 105 as described in the method of FIG. 3 below.

FIG. 3 illustrates a flow chart of a method 300 for generating a seismic image of the subsurface 105 in accordance with implementations described herein. It should be understood that while the flow chart indicates a particular order of execution, in some implementations, certain operations of method 300 may be executed in a different order. In one implementation, method 300 may be performed by a computer application. The following description of method 300 is made with reference to the marine-based survey of FIGS. 1-2.

At step 310, the computer application may receive seismic data from two or more sensors 135 in marine seismic survey 100. While being towed, each sensor 135 may continuously record the seismic data it receives from reflections 130. As such, the seismic data received by each sensor 135 may be defined according to a function of time and space. The time may represent the time at which the seismic data was received or acquired and the space may indicate a position on the earth where the seismic data was received or acquired. The received seismic data may include a combination of active and passive surveying, which may include a broad spectrum of low and high-frequency acoustic waves.

At step 320, the computer application may regularize the seismic data received at sensors 135 with respect to space using a time-space operator. Regularizing the seismic data may include identifying the seismic data acquired by sensors 135 at different times but at a particular location on the earth. For instance, the computer application may organize all the seismic data acquired by each sensor 135 at position X. In one implementation, the computer application may concatenate the seismic data received by sensor $135_1$ at t=0, the seismic data received by sensor $135_2$ at t=1, the seismic data received by sensor $135_3$ at t=2, the seismic data received by sensor $135_4$ at t=3 and the seismic data received by sensor $135_5$ at t=4. By regularizing the seismic data, the computer application may sort the seismic data such that it reflects the absolute recording time. The seismic data may then be characterized as having a fixed position or having been acquired by a stationary receiver in order to facilitate more efficient seismic processing.

In one implementation, the computer application may regularize the seismic data received from sensors 135 during the marine seismic survey by deriving a correction for the sensor's motion. The correction may correct for a time-variant positioning of the seismic data, which includes the time-variant spatial shift.

At step 330, the computer application may distinguish between the low-frequency seismic data and the high-frequency seismic data. In one implementation, all seismic data that is below and equal to 2 Hz may be classified as low-frequency seismic data. Although 2 Hz is used as an example here, it should be understood that other frequencies may be used to distinguish between low-frequency seismic data and high-frequency seismic data. The predetermined frequency is referred to as fmin. In one implementation, the predetermined frequency may be identified based on the sources and sensors used in the marine seismic survey. In order to distinguish between the low and high-frequency seismic data, the computer application may apply a low pass band filter on the seismic data up to fmin. However, it should be noted that other seismic data processing techniques may be used to distinguish between the low-frequency seismic data and the high-frequency seismic data.

In some cases, the seismic data at the fmin, e.g., 2 Hz, may be classified as both high and low-frequency. In these cases, the seismic data that overlaps between high and low-frequency may be used to generate a velocity model.

At step 340, the computer application may re-sample the low-frequency seismic data based on the predetermined frequency (e.g., fmin) to make computations involved in method 300 more computationally efficient. Since sensors 135 may be continually recording seismic data, the computer application may receive a large amount of seismic data for processing which may make the computing costs for performing method 300 expensive. Therefore, by re-sampling the low-frequency seismic data, the computations involved in method 300 may be performed more efficiently.

In one implementation, the low-frequency seismic data may be re-sampled according to a time interval and a spatial interval. As such, seismic data recorded at each time interval may be used in the re-sample. Similarly, seismic data recorded at each spatial interval may be used in the re-sample. The time interval may be based on the fmin and a Nyquist sampling theorem. In one implementation, the time interval, dt, may be determined according to the following formula:

$$dt < \frac{1}{2 * f\min}$$

The spatial interval may be based on the fmin, a Nyquist sampling theorem, and the vmin. The vmin may represent the frequency of the ambient noise in the ocean. In one implementation, the spatial interval, dx, may be determined according to the following formula:

$$dx < \frac{v\min}{2 * f\min}$$

Re-sampling seismic data in the low-frequencies may provide an advantage in the cross-line direction of the seismic data. Although step 340 may allow the computer application to perform method 300 more efficiently, it should be noted that step 340 is an optional step and is not required to perform method 300.

At step 350, the computer application may attenuate unwanted noise modes of the marine seismic survey in the re-sampled low-frequency seismic data. The unwanted noise modes may include ambient noise present in the water column, guided waves in the sea, swell noise (i.e., sea surface induce noise), self noise in the streamer and the like. In one implementation, the length of ambient noise recorded by each sensor 135 may depend on the speed of vessel 145 and the length of the streamer. Like step 340, step 350 is also an optional step in method 300. However, by attenuating unwanted noise, the computer application may generate more accurate seismic images. In one implementation, the computer application may attenuate the unwanted noise modes using two-dimensional signal processing.

At step 360, a set of low-frequency Green's functions may be calculated using interferometry on the attenuated low-frequency seismic data. The set of low-frequency Green's functions may describe the impulse responses at a pair of sensors. In the implementation where attenuation is optional, the set of low-frequency Green's functions may be calculated using Interferometry on the re-sampled low-frequency seismic data. An example of the Green's function for two receivers at locations, $x_1$ and $x_2$ follows:

$$(G(x1,x2,t)+G(x1,x2,-t))*a(t) \approx \Sigma(v(x1,-t)*v(x2,t))$$

Wapenaar, 2004, *Retrieving the Elastodynamic Green's Function of an Arbitrary Inhomogeneous Medium by Cross-Correlation:* 93 Phys. Rev. Lett., 254301 (2004) where v includes vertical component noise records recorded at locations $x_1$ and $x_2$; $G(x_1,x_2,t)$ is the Green's function between locations $x_1$ and $x_2$ corresponding to a recorded particle velocity at $x_2$ and a vertical point force (impulse) at $x_1$; and a(t) is the auto-correlation of the source time function of all noise records. Although implementations of various techniques have been described with reference to a continuously recording seismic data using sensors 135, it should be understood that some implementations may contemplate breaks or pauses between seismic recordings. In either case, all records that are included in the sum are acquired from the same locations. Additionally, in one implementation, the formula above can be generalized to other source types and other recorded quantities such as horizontal components of particle velocity.

Interferometry is a means of constructing Green's functions between two points. In one implementation, one sensor 135 may be located at a point. For each pair of sensors in the attenuated low-frequency seismic data, a seismic data set may be produced for one of the sensors 135 using interferometry. The produced seismic data set may represent reflected waves at a first sensor (e.g., sensor $135_1$) of the pair due to a virtual source located at the second sensor (e.g., sensor $135_2$). In other words, the second sensor $135_2$ may be treated as the source 120. The full set of seismic data produced for every sensor 135 pair is referred to herein as an interferometric reflection seismic data set.

In one implementation, the computer application may perform interferometry using a process that includes cross-correlation and summation. In this manner, as many time-windows are cross-correlated and summed, the interferometry result converges towards something which resembles and active shot gather. However, it should be noted that interferometry may be performed using deconvolution and other operators, which may make it possible to speed up the convergence.

At step 370, the computer application may process the high frequency seismic data received at step 310 to create a set of high-frequency Green's functions. In one implementation, the high-frequency seismic data may be acquired from the active seismic survey data that is at or above the fmin described above.

At step 380, the computer application may merge the set of low-frequency Green's functions with the set of high-frequency Green's functions. By merging the low and high frequencies, the computer application may create a set of broad-band Green's functions.

In one implementation, a regularization process may be used to perform the merger. The regularization process may interpolate the virtual source locations of the set of low-frequency Green's functions to locations of actual sources in the set of high-frequency Green's functions. The overlapping data in the fmin frequency band may also be used to tie and calibrate the sets of high and low-frequency Green's functions to each other.

After creating the set of broad-band Green's functions, the computer application may use the set of broad-band Green's functions to perform various types of seismic data analysis. In one implementation, the computer application may generate a seismic image of the subsurface 105 using the set of broad-band Green's functions. In another implementation, the set of broad-band Green's functions may be used for velocity analysis. For instance, the set of broad-band Green's functions may also be used to generate a velocity model of the subsurface 105. The computer application may generate a velocity model using a full waveform inversion procedure, which may be an iterative process that uses a range of frequencies within the set of broad-band Green's functions to produce the velocity model. The computer application may select a low-frequency within the set of broad-band Green's functions and may invert seismic data at the selected frequency to generate a low-resolution model that fits the seismic data at the selected frequency.

The computer application may then select a higher frequency and invert the seismic data at the higher frequency with the low-resolution velocity model to generate a higher resolution model. The process may then be repeated, using seismic data from progressively higher frequencies and each progressively generated model, until a velocity model of desired resolution is generated.

To generate the seismic image of the set of high-frequency Green's functions, the computer application may perform a reverse time migration using the velocity model and the set of high-frequency Green's functions.

Method 300 described above may significantly increase the seismic bandwidth of seismic data acquired from sensors in a marine seismic survey. For instance, method 300 may use low frequency body wave data acquired by sensors 135 for the interferometry performed in step 360. In this manner, the low frequency body wave data may expand the available bandwidth of seismic data for inversion. Although method 300 is described with reference to the marine seismic survey of FIGS. 1-2, it should be noted that method 300 may also be performed in a marine seismic survey that includes more than one vessel towing more than one streamer at the same time. In this type of marine survey, the computer application may perform seismic interferometry using the seismic data from sensors of each streamer at longer offsets. Method 300 may also be employed in a marine seismic survey that uses a coil shooting configuration.

Figure 4:
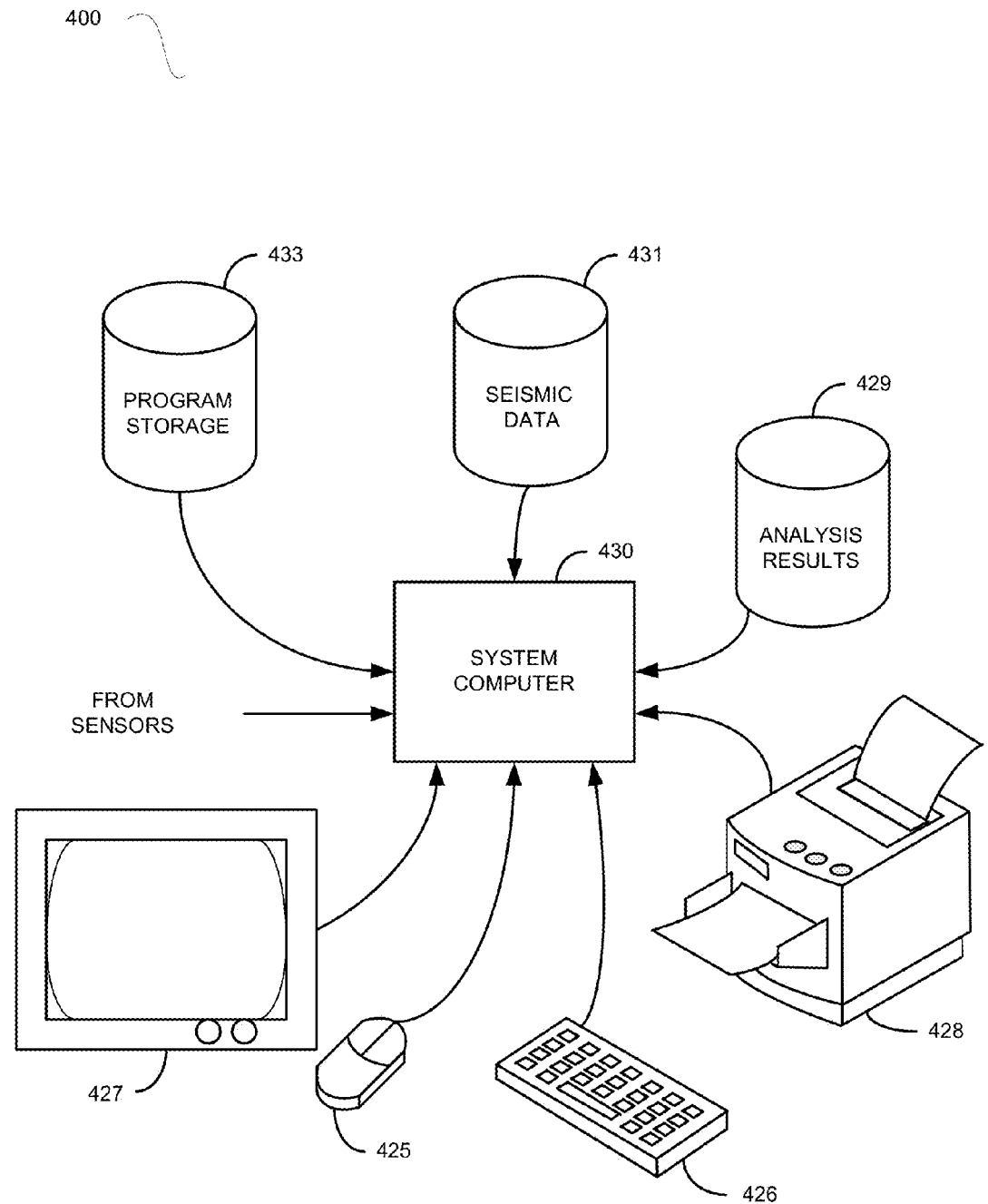
FIG. 4 illustrates a computer network into which implementations of various technologies described herein may be implemented.

FIG. 4 illustrates a computer network 400, into which implementations of various technologies described herein may be implemented. In one implementation, various techniques for generating a seismic image of the subsurface as described in FIG. 3 may be performed on the computer network 400. The computer network 400 may includes a system computer 430, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, high-performance clusters of computers, co-processing-based systems (GPUs, FPGAs) and the like. In one implementation, the computer application described in the method of FIG. 4 may be stored on the system computer 430.

The system computer 430 is in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, seismic data from hydrophones are stored in disk storage device 431. The system computer 430 may retrieve the appropriate data from the disk storage device 431 to process seismic data according to program instructions according to program instructions that correspond to the implementations of various technologies described herein. The program instructions may be written in a computer programming language, such as C++, Java and the like. The program instructions may be stored in a computer-readable memory, such as program disk storage device 433. Such computer-readable media may include computer storage media and communication media.

Computer storage media may include volatile and nonvolatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 430 may present output primarily onto graphics display 427. The system computer 430 may store the results of the methods described above on disk storage 429, for later use and further analysis. The keyboard 426, the pointing device (e.g., a mouse, trackball, or the like) 425 and the printer 428 may be provided with the system computer 430 to enable interactive operation.

The system computer 430 may be located at a data center remote from the survey region. The system computer 430 is in communication with hydrophones (either directly or via a recording unit, not shown), to receive signals indicative of the reflected seismic energy. After conventional formatting and other initial processing, these signals may be stored by the system computer 430 as digital data in the disk storage 431 for subsequent retrieval and processing in the manner described above. In one implementation, these signals and data may be sent to the system computer 430 directly from sensors, such as geophones, hydrophones and the like. When receiving data directly from the sensors, the system computer 430 may be described as part of an in-field data processing system. In another implementation, the system computer 430 may process seismic data already stored in the disk storage 431. When processing data stored in the disk storage 431, the system computer 430 may be described as part of a remote data processing center, separate from data acquisition. The system computer 430 may be configured to process data as part of the in-field data processing system, the remote data processing system or a combination thereof. While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
receiving the seismic data acquired at two or more sensors on a towed marine survey;
regularizing the seismic data in space;
classifying the regularized seismic data below and equal to a predetermined frequency as low-frequency seismic data;
calculating, using a microprocessor, a set of low-frequency Green's functions using interferometry on the low-frequency seismic data;
processing high-frequency seismic data of the seismic data to create a set of high-frequency Green's functions at one or more source locations of the towed marine survey; and
merging the set of low-frequency Green's functions and the set of high-frequency Green's functions to create a set of broad-band Green's functions at the source locations.

2. The method of claim 1, wherein regularizing the seismic data in space comprises organizing the seismic data based on one or more locations at which the seismic data was received.

3. The method of claim 1, further comprising attenuating one or more noise modes in the low-frequency seismic data.

4. The method of claim 3, wherein the noise modes comprise ambient noise present in a sea, one or more guided waves in the sea, swell noise of a sea surface, self noise due to one or more streamers, or combinations thereof.

5. The method of claim 1, wherein the set of low-frequency Green's functions comprises one or more reflection seismic data based on one or more cross-correlations between the two or more sensors, and wherein one of the two or more sensors is configured as a source of the reflection seismic data.

6. The method of claim 1, wherein the seismic data is classified using a low pass filter.

7. The method of claim 1, further comprising generating a seismic image using the set of broad-band Green's functions.

8. The method of claim 7, wherein generating the seismic image comprises:
producing a velocity model based on the set of broad-band Green's functions; and
imaging the set of high-frequency Green's functions using the velocity model.

9. The method of claim 8, wherein imaging the set of high-frequency Green's functions comprises performing a reverse time migration using the velocity model and the set of high-frequency Green's functions.

10. The method of claim 1, wherein the predetermined frequency is based on one or more sources and the sensors.

11. The method of claim 1, wherein the seismic data are obtained through continuous recording for the seismic data and surrounding noise.

12. The method of claim 1, further comprising re-sampling the low-frequency seismic data based on the predetermined frequency, and wherein the set of low-frequency Green's functions is calculated using interferometry on the re-sampled low-frequency seismic data.

13. The method of claim 12, wherein the low-frequency seismic data are re-sampled according to a time interval and a spatial interval based on the predetermined frequency and a Nyquist sampling theorem.

14. The method of claim 13, wherein the Nyquist sampling theorem specifies that the spatial interval is less than $v*(2*f)^{-1}$, where v is a frequency of noise in the recorded seismic data and f is the predetermined frequency.

15. A method for processing seismic data comprising:
receiving the seismic data acquired at two or more sensors on a towed marine survey;
regularizing the seismic data in space;
classifying the regularized seismic data above and equal to a predetermined frequency as high-frequency seismic data and below and equal to the predetermined frequency as low-frequency seismic data;
re-sampling the low-frequency seismic data based on the predetermined frequency;
attenuating one or more noise modes in the re-sampled seismic data;
calculating, using a microprocessor, a set of low-frequency Green's functions using interferometry on the attenuated seismic data;
processing the high-frequency seismic data of the seismic data to create a set of high-frequency Green's functions at one or more source locations of the towed marine survey; and
merging the set of low-frequency Green's functions and the set of high-frequency Green's functions to create a set of broad-band Green's functions at the source locations.

16. The method of claim 15, wherein the predetermined frequency is based on one or more sources and the sensors.

17. The method of claim 15, wherein the low-frequency seismic data are re-sampled according to a time interval and a spatial interval based on the predetermined frequency and a Nyquist sampling theorem.

18. The method of claim 15, wherein the interferometry comprises using cross-correlation functions, deconvolution functions, summation functions, or combinations thereof.

19. A system, comprising:
a processor; and
a memory having program instructions configured to cause the processor to:
receive seismic data acquired by one or more seismic sensors on a towed marine survey;
regularize the seismic data in space;
classify the regularized seismic data below and equal to a predetermined frequency as low-frequency seismic data;
calculate a set of low-frequency Green's functions using interferometry on the low-frequency seismic data;
process high-frequency seismic data of the seismic data to create a set of high-frequency Green's functions at one or more source locations of the towed marine survey; and
merge the set of low-frequency Green's functions and the set of high-frequency Green's functions to create a set of broad-band Green's functions at the source locations; and
generate a seismic image using the set of broadband Green's functions.

20. The system of claim 19, wherein the program instructions configured to cause the processor to regularize the seismic data comprises programs instructions configured to:
identify seismic data acquired by the seismic sensors at a position on the earth; and
concatenate the identified seismic data.

* * * * *